(12) United States Patent
Yokogawa et al.

(10) Patent No.: US 11,729,328 B2
(45) Date of Patent: Aug. 15, 2023

(54) INFORMATION PROCESSING DEVICE, METHOD, AND A NON-TRANSITORY COMPUTER READABLE STORAGE MEDIUM FOR SCANNING AN IMAGE USING A PROTECTIVE SHEET TO ESTIMATE A RATIO OF DOCUMENT LENGTHS, ACQUIRED FROM SCANNED IMAGES, TO CORRECT A LENGTH OF A SCANNED IMAGE OR LENGTH OF A CROPPED IMAGE, BASED ON THE RATIO

(71) Applicant: PFU LIMITED, Kahoku (JP)

(72) Inventors: Takeshi Yokogawa, Kahoku (JP);
Hiroyasu Goto, Kahoku (JP)

(73) Assignee: PFU LIMITED, Kahoku (JP)

( * ) Notice: Subject to any disclaimer, the term of this patent is extended or adjusted under 35 U.S.C. 154(b) by 64 days.

(21) Appl. No.: 17/475,546

(22) PCT Filed: Mar. 19, 2019

(86) PCT No.: PCT/JP2019/011351
§ 371 (c)(1),
(2) Date: Sep. 15, 2021

(87) PCT Pub. No.: WO2020/188729
PCT Pub. Date: Sep. 24, 2020

(65) Prior Publication Data
US 2022/0311891 A1    Sep. 29, 2022

(51) Int. Cl.
*H04N 1/393* (2006.01)
*H04N 1/00* (2006.01)

(52) U.S. Cl.
CPC ......... *H04N 1/00713* (2013.01); *H04N 1/393* (2013.01)

(58) Field of Classification Search
CPC ....... H04N 1/00713; H04N 1/04; H04N 1/393
(Continued)

(56) References Cited

U.S. PATENT DOCUMENTS 8,897,574 B2 *  11/2014  Kawatani ................. H04N 1/38
382/199

FOREIGN PATENT DOCUMENTS

| JP | 6-274683 A | 9/1994 |
|---|---|---|
| JP | 9-270907 A | 10/1997 |

(Continued)

OTHER PUBLICATIONS

International Search Report dated Jun. 11, 2019, issued in counterpart International Application No. PCT/JP2019/011351 (1 page).

(Continued)

*Primary Examiner* — Chad Dickerson
(74) *Attorney, Agent, or Firm* — WHDA, LLP

(57) ABSTRACT

An information processing device executes: acquiring a scanned image of a document and a protective sheet that protects the document, the scanned image being obtained by imaging the document and the protective sheet while being conveyed at the same time; acquiring a first length that is a conveying direction length of a predetermined portion of the protective sheet; acquiring a second length that is a conveying direction length of the predetermined portion in the scanned image; and estimating a ratio between a document length, which is a conveying direction length of the document, and a document image length, which is a conveying direction length of the document in the scanned image, based on the first length and the second length.

12 Claims, 11 Drawing Sheets

(58) Field of Classification Search
USPC .................................. 358/449, 1.11–1.18
See application file for complete search history.

(56) References Cited

FOREIGN PATENT DOCUMENTS

| | | | | |
|---|---|---|---|---|
| JP | 09270907 | A | * | 10/1997 |
| JP | 10095544 | A | * | 4/1998 |
| JP | H10-095544 | A | | 4/1998 |
| JP | 2002247348 | A | * | 8/2002 |
| JP | 2003-338920 | A | | 11/2003 |
| JP | 2003338920 | A | * | 11/2003 |
| JP | 2006166180 | A | * | 6/2006 |
| JP | 2007110521 | A | * | 4/2007 |
| JP | 2015-76637 | A | | 4/2015 |

OTHER PUBLICATIONS

Office Action dated Aug. 23, 2022, issued in counterpart JP Application No. 2021-506876, with English Translation. (15 pages).

* cited by examiner

INFORMATION PROCESSING DEVICE, METHOD, AND A NON-TRANSITORY COMPUTER READABLE STORAGE MEDIUM FOR SCANNING AN IMAGE USING A PROTECTIVE SHEET TO ESTIMATE A RATIO OF DOCUMENT LENGTHS, ACQUIRED FROM SCANNED IMAGES, TO CORRECT A LENGTH OF A SCANNED IMAGE OR LENGTH OF A CROPPED IMAGE, BASED ON THE RATIO

CROSS-REFERENCE TO RELATED APPLICATION

This application is a continuation application of International Application PCT/JP2019/011351 filed on Mar. 19, 2019, and designated the U.S., the entire contents of which are incorporated herein by reference.

FIELD

The present disclosure relates to technology for processing an image obtained by imaging (image capturing).

BACKGROUND

Conventionally, with an optical character reading device that performs character recognition on a scanned image of a form that has a predetermined format, there is a proposal in which the dimension from the leading end of a form to the reading position is detected by a scanner, form dimension information and the actual dimensions of the form detected by a position detection unit are compared, and various pieces of position information are corrected according to the ratio between the dimensions (see Japanese Patent Application Publication No. H06-274683).

There is also a proposal in which a left sheet end and a right sheet end, which extend along the sub scanning direction of image reading data, are extracted, skew correction is performed on the extracted edges, and magnification correction with respect to the main scanning direction is performed based on the corrected left sheet end position and right sheet end position (see Japanese Patent Application Publication No. 2015-76637).

There is also a proposal for a mobile document reading device in which a document is conveyed in a state of being sandwiched in a transparent carrier sheet that has been provided with black and white marks at predetermined intervals, and the black and white marks on the carrier sheet are read and compared with a reference in order for the read data to be enlarged, reduced, or stored as-is (see Japanese Patent Application Publication No. H09-270907).

SUMMARY

Scanners such as so-called ADF (Auto Document Feeder) scanners in which a document is subjected to imaging while being conveyed in an imaging unit are in conventional use, and with such scanners, sometimes a protective sheet (carrier sheet) is used to sandwich the document and is conveyed to the imaging unit at the same time as the document in order to prevent damage to the document when being conveyed by the conveying mechanism.

However, if a document is subjected to imaging while being conveyed using a protective sheet, the thickness is higher than that of an ordinary document due to the document being sandwiched in the protective sheet, and the friction coefficient of the protective sheet is different from the friction coefficient of an ordinary document, and due to reasons such as these, it is possible for a problem to occur in which the conveying direction length of the image obtained by performing imaging during conveying is different from the actual conveying direction length of the imaging target.

In view of the above problems, an object of the present disclosure is to detect a mismatch between the actual document length and the document image length that occurs when a protective sheet is used in a type of imaging device in which a document is subjected to imaging while being conveyed in an imaging unit.

An information processing device according to one example of the present disclosure includes: image acquiring means for acquiring a scanned image of a document and a protective sheet that protects the document, the scanned image being obtained by imaging the document and the protective sheet while being conveyed at the same time; first acquiring means for acquiring a first length that is a conveying direction length of a predetermined portion of the protective sheet; second acquiring means for acquiring a second length that is a conveying direction length of the predetermined portion in the scanned image; and estimating means for estimating a ratio between a document length, which is a conveying direction length of the document, and a document image length, which is a conveying direction length of the document in the scanned image, based on the first length and the second length.

The present disclosure can be construed as an information processing device, a system, a method executed by a computer, or a program for execution by a computer. The present disclosure can also be construed as a mode in which the program has been recorded on a recording medium that can be read by a computer or another device or machine, for example. Here, a recording medium that can be read by a computer or the like means a recording medium on which information such as data or a program is stored electrically, magnetically, optically, mechanically, or chemically and can be read by a computer or the like.

According to the present disclosure, it is possible to detect a mismatch between an actual document length and a document image length that occurs when a protective sheet is used in a type of imaging device in which a document is subjected to imaging while being conveyed in an imaging unit.

DESCRIPTION OF EMBODIMENTS

Hereinafter, embodiments of an information processing device, a method, and a program according to the present disclosure will be described with reference to the drawings. However, the embodiments described below are merely examples of embodiments, and the information processing device, the method, and the program according to the present disclosure are not limited to the specific configurations described below. When implementing the present invention, specific configurations may be appropriately adopted according to the embodiment, and various improvements and modifications may be made.

The following describes embodiments in the case where the information processing device, the method, and the program according to the present disclosure are implemented as a system that works in conjunction with a scanner. However, the information processing device, the method, and the program according to the present disclosure can be broadly used with techniques for processing image data acquired by an imaging device, and applicable targets of the present disclosure are not limited to the examples described in the following embodiments.

First Embodiment

Figure 1:
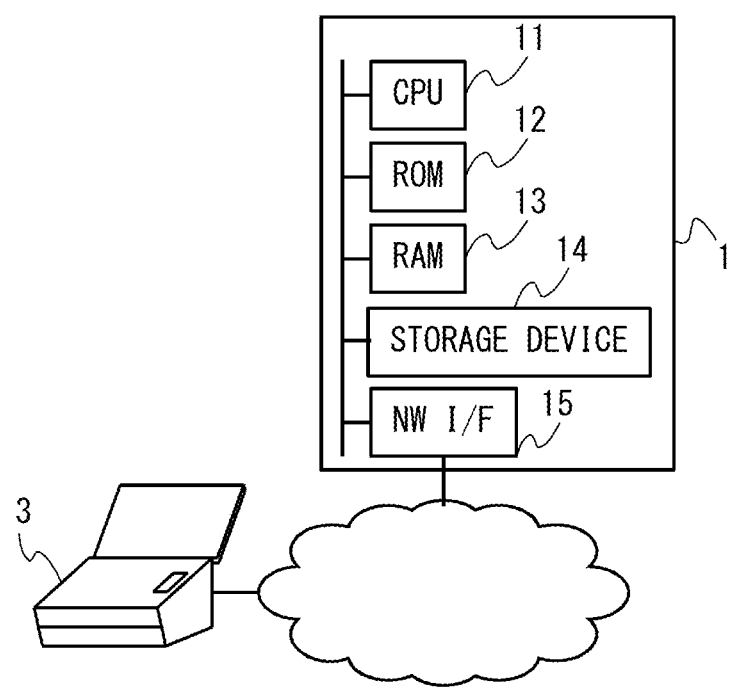
FIG. 1 is a schematic diagram showing a configuration of a system according to a first embodiment.

FIG. 1 is a schematic diagram showing the configuration of a system according to the present embodiment. This system according to the present embodiment includes a scanner 3 and an information processing device 1 that are communicably connected to each other via a network or other communication means.

The information processing device 1 is a computer that includes: a CPU (Central Processing Unit) 11; a storage device 14 such as a ROM (Read Only Memory) 12, a RAM (Random Access Memory) 13, an EEPROM (Electrically Erasable and Programmable Read Only Memory), or an HDD (Hard Disk Drive); a communication unit 15, and the like. For the sake of brevity, the information processing device 1 is shown as a computer in a single housing in the figure, but in the present embodiment, with use of cloud technology or the like, part or all of the functions of the information processing device 1 may be realized by a device installed at a remote location or a plurality of devices installed in a distributed manner. Note that the configuration of the information processing device 1 is not limited to the example in the present embodiment.

Figure 2:
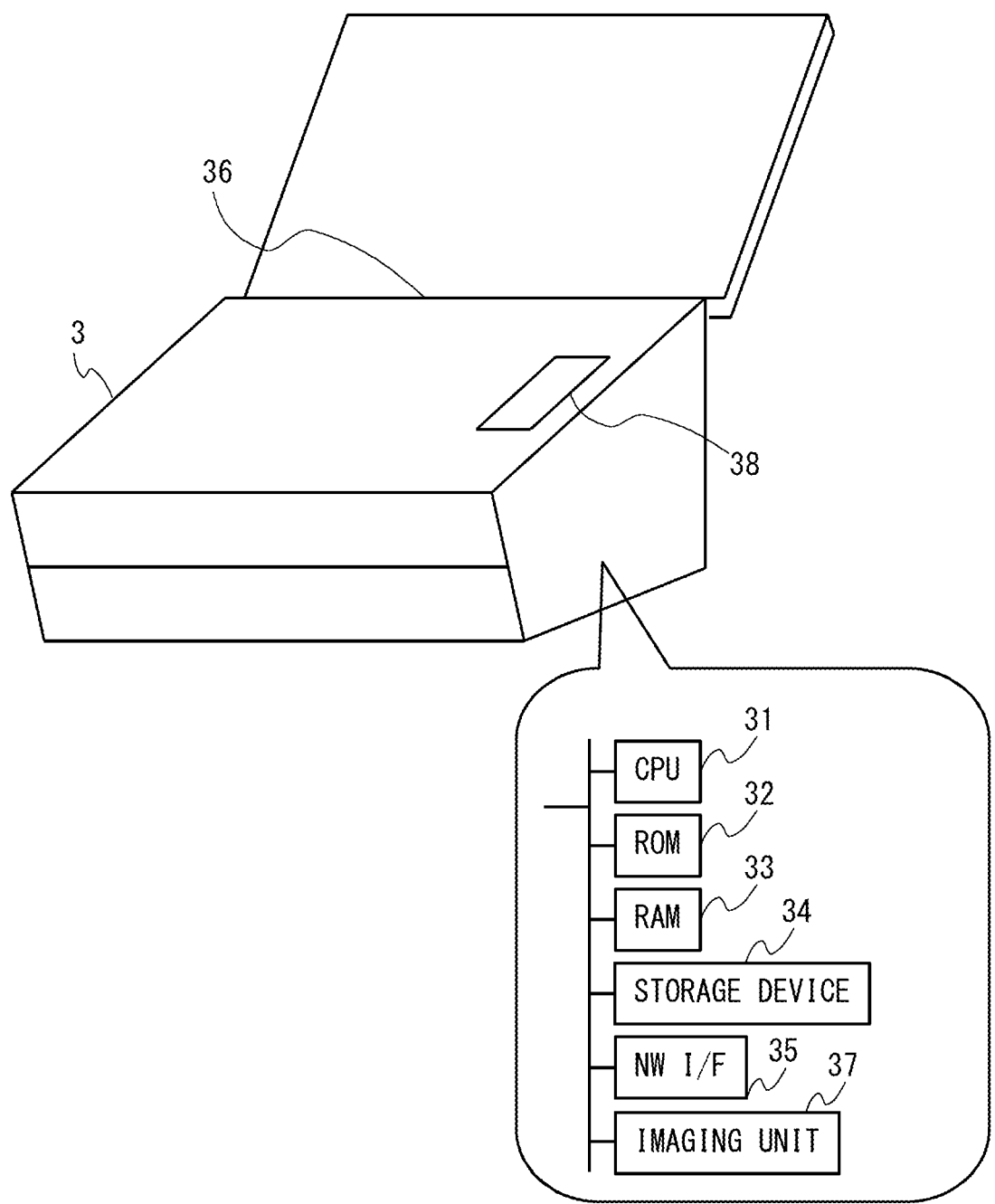
FIG. 2 is a diagram showing an overview of a hardware configuration of a scanner according to the first embodiment.

FIG. 2 is a diagram showing an overview of the hardware configuration of the scanner 3 according to the present embodiment. The scanner 3 is a device that acquires image data by capturing images of a document such as a manuscript, a business card, a receipt, or a photograph/illustration set by a user, and is an imaging device that includes a sheet feeder (conveying unit) 36 that sends the document to an imaging unit 37, the imaging unit 37, a scan button 38, a CPU 31, a ROM 32, a RAM 33, a storage device 34, a communication unit 35, and the like. Note that the scanner 3 according to the present embodiment employs an imaging method in which a document set in the sheet feeder 36 is subjected to imaging while being automatically fed.

The scanner 3 according to the present embodiment is a scanner capable of connecting to a wireless LAN due to including a wireless communication function. Also, the scanner 3 according to the present embodiment has the scan button 38 that the user presses or touches to instruct the scanner 3 to capture an image. The scanner 3 may further have a user interface for enabling character input/output and item selection (e.g., a touch panel display or a keyboard), as well as a web browser function and a server function. However, the communication means, the hardware configuration, and the like of the scanner that can adopt the method according to the present embodiment are not limited to the example in the present embodiment.

In the scanner 3, a program recorded in the storage device 34 is read to the RAM 33 and executed by the CPU 31 to control the hardware provided in the scanner 3, and thus the sheet feeder (conveying unit) 36 and the imaging unit 37 are controlled. Note that in the present embodiment, the functions included in the scanner 3 are executed by the CPU 31, which is a general-purpose processor, but some or all of these functions may be executed by one or a plurality of dedicated processors.

When a predetermined user operation is accepted, the scanner 3 acquires image data by capturing an image while conveying the target. Specifically, when an operation performed on the scan button 38 is accepted, the scanner 3 according to the present embodiment controls the sheet feeder (conveying unit) 36 to send a document to the imaging unit 37 (if the document is sandwiched in a protective sheet (carrier sheet), the document is sent to the imaging unit 37 by conveying the carrier sheet), and the document (and the carrier sheet) are subjected to imaging to acquire image data. The scanner 3 then transmits the image data acquired by the imaging to the information processing device 1. The transmitted image data is acquired by an image acquisition unit 21 of the information processing device 1. In the present embodiment, pressing or touching the scan button 38 provided on the scanner 3 is accepted as a user operation for instructing the collective execution of a series of processing steps from the start of scanning to the generation/output of an output image. However, the predetermined user operation that triggers the start of scanning is not limited to the example in the present disclosure.

Figure 3:
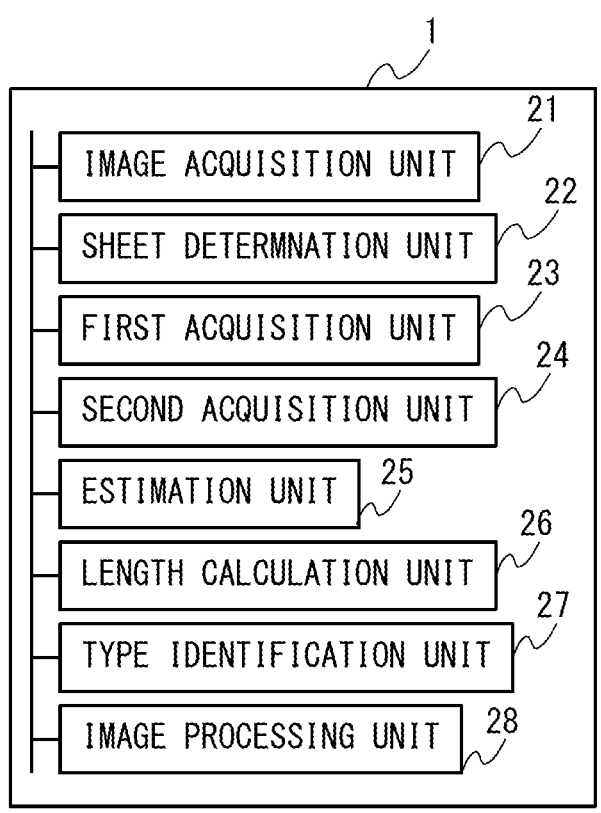
FIG. 3 is a diagram showing an overview of a functional configuration of an information processing device according to the first embodiment.

FIG. 3 is a diagram showing an overview of the functional configuration of the information processing device 1 according to the present embodiment. In the information processing device 1, a program recorded in the storage device 14 is read to the RAM 13 and executed by the CPU 11 to control hardware provided in the information processing device 1, thus functioning as a device that includes the image acquisition unit 21, a sheet determination unit 22, a first acquisition unit 23, a second acquisition unit 24, an estimation unit 25, a length calculation unit 26, a type identification unit 27, and an image processing unit 28. Note that in the present embodiment, the functions provided in the information processing device 1 are executed by the CPU 11, which is a general-purpose processor, but some or all of these functions may be executed by one or a plurality of dedicated processors.

The image acquisition unit 21 acquires a scanned image of a document and a protective sheet (called a "carrier sheet"

in the present embodiment) for protecting the document, the scanned image being obtained by imaging the document and the protective sheet while being conveyed at the same time.

Figure 4:
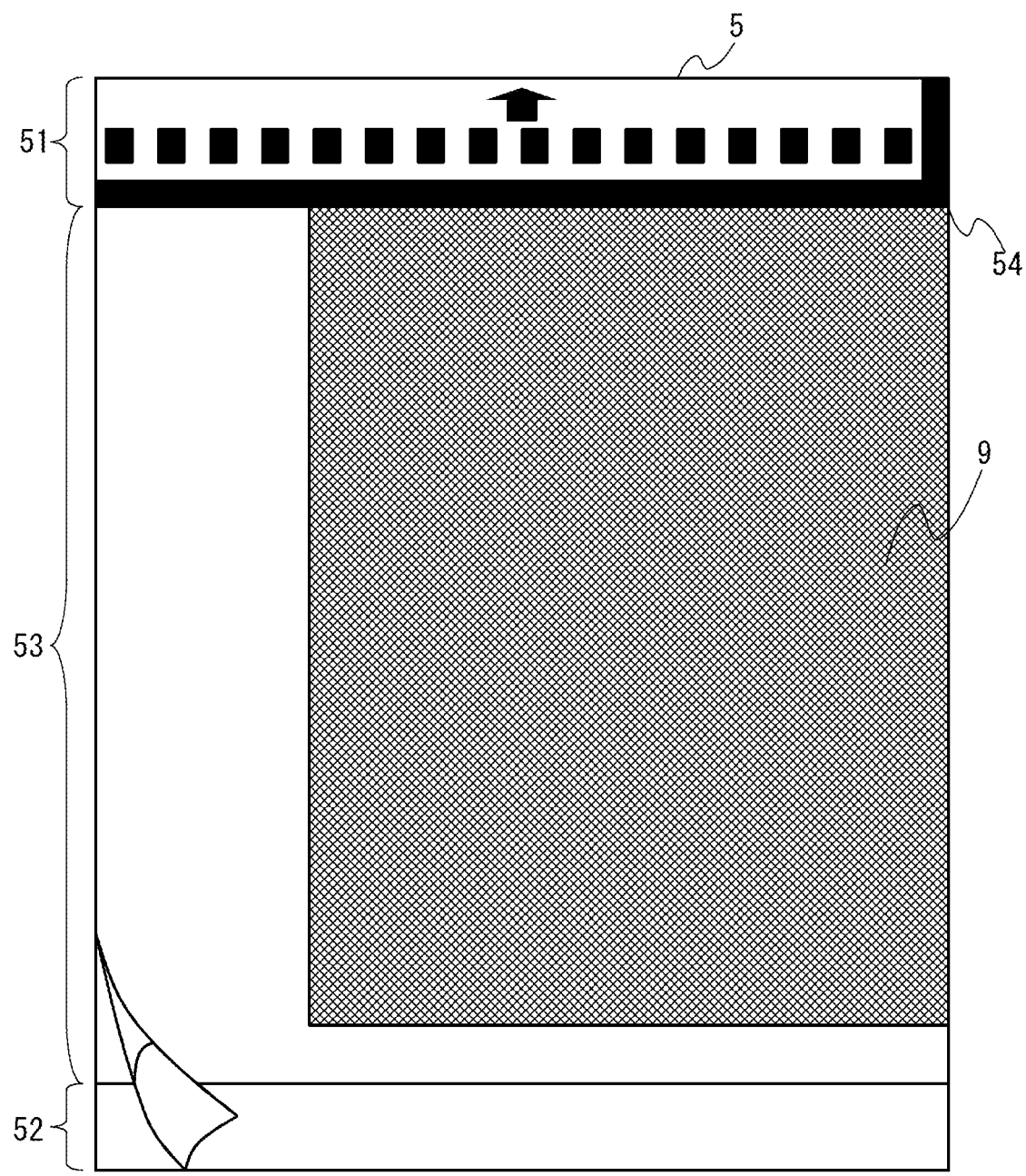
FIG. 4 is a diagram showing a carrier sheet used in the first embodiment and a document sandwiched in the carrier sheet.

FIG. 4 is a diagram showing a carrier sheet 5 used in the present embodiment and a document 9 sandwiched in the carrier sheet 5. The carrier sheet 5 according to the present embodiment has a structure capable of sandwiching the document 9 (shaded portion in the drawing) between two films, and the front and back films are adhered together in an upper end portion 51 that is set in the sheet feeder 36. The upper end portion 51 and a lower end portion 52 are colored on a white background, and in a document setting portion 53 between the upper end portion 51 and the lower end portion 52, the front film and the back film are both transparent such that an image of the document 9 sandwiched in the carrier sheet 5 can be obtained from the outside of the carrier sheet 5. The user sets the document 9 in the document setting portion 53 by opening the carrier sheet 5 from the lower end portion 52 and the document setting portion 53 (separating the front film and the back film), placing the document 9 against the adhesive position of the upper end portion 51, and then closing the carrier sheet 5 (bringing the front film and back film together).

Also, the white background of the upper end portion 51 of the carrier sheet 5 has printed thereon marks for identifying the carrier sheet 5 (in the present embodiment, a plurality of black squares arranged at predetermined intervals in the direction orthogonal to the conveying direction), an L-shaped black band for detecting a reference point 54 and the upper end portion 51 (the apex of L shape is the reference point 54), and an arrow indicating the setting direction (conveying direction) for the sheet feeder 36. Also, although not shown, guidance instructing the user how to use the carrier sheet 5 for example may be printed in the upper end portion 51 and/or the lower end portion 52. However, the specific specifications of the carrier sheet are not limited to the example described in the present embodiment.

The reference point 54 is used as a reference for a combining position at the time of front-back combining processing, which will be described later, and as a reference for a cropping position when image cropping is performed. Therefore, when the document 9 is to be sandwiched between the carrier sheet 5 in order to perform front-back combining processing, or an image is to be cropped with a designated size, the user sets the document 9 such that a corner of the document 9 is aligned with the reference point 54 (see FIG. 4). However, if front-back combining processing or cropping to a designated size are not to be performed, the user does not need to align a corner of the document 9 with the reference point 54.

Figure 5:
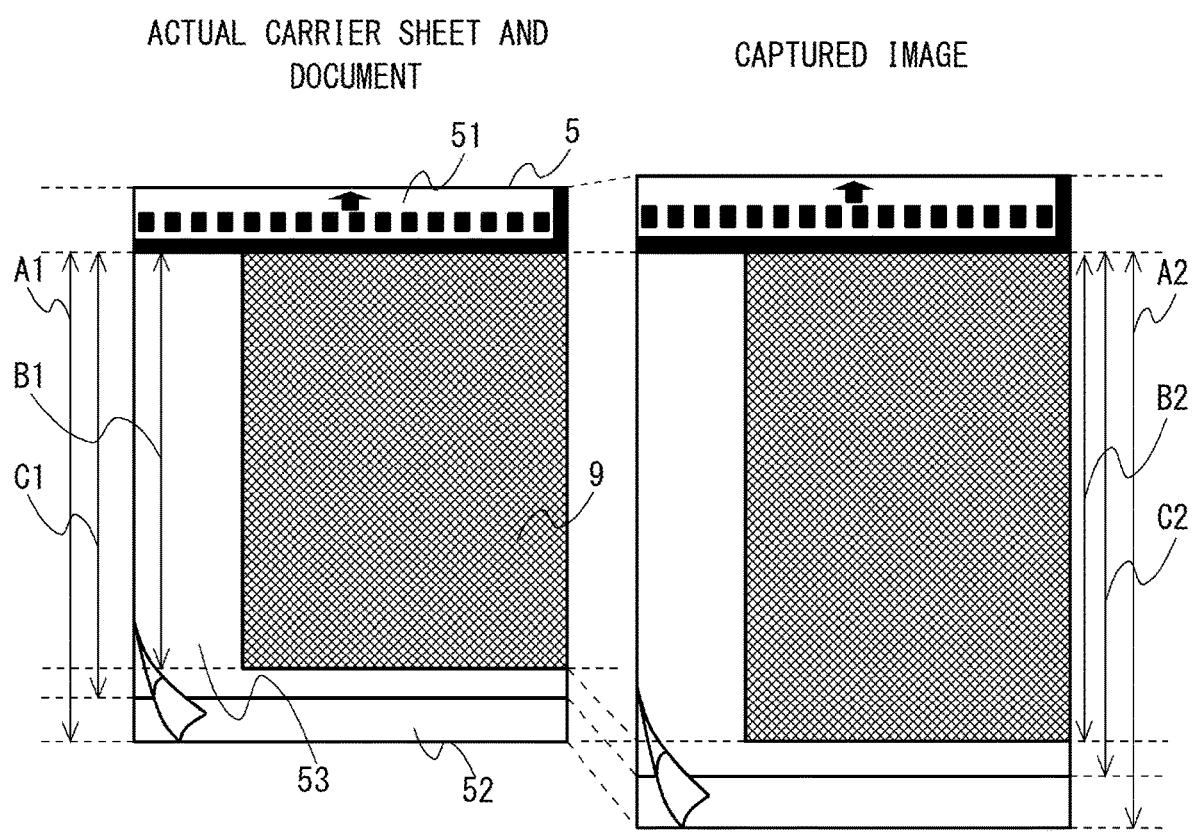
FIG. 5 is a diagram comparing the actual size of the carrier sheet and a document with the size of a scanned image obtained by subjecting the carrier sheet and the document to imaging while being conveyed in the first embodiment.

FIG. 5 is a diagram comparing the actual size of the carrier sheet 5 and the document 9 with the size of a scanned image obtained by subjecting the carrier sheet 5 and the document 9 to imaging while being conveyed in the present embodiment. FIG. 5 shows how the actual length of the imaging target in the conveying direction differs from the length of the imaging target in a captured image due to a reason such as the carrier sheet 5 slipping during conveying. Although described in detail later, a first length A1 is the conveying direction length of a predetermined portion of the carrier sheet 5 (in the present embodiment, the document setting portion 53 and the lower end portion 52), a second length A2 is the conveying direction length of the predetermined portion in the scanned image, a document length B1 is the conveying direction length of the document 9, a document image length B2 is the conveying direction length of the document 9 in the scanned image, a document setting portion length C1 is the conveying direction length of the document setting portion 53, and a document setting portion image length C2 is the conveying direction length of the document setting portion 53 in the scanned image.

The sheet determination unit 22 determines whether or not the scanned image includes an image of the carrier sheet 5. Also, the sheet determination unit 22 further determines the type of the carrier sheet 5 included in the scanned image. A specific determination method will be described later.

The first acquisition unit 23 acquires the first length A1, which is the conveying direction length of the predetermined portion of the carrier sheet 5. The actual conveying direction length is preferably used as the conveying direction length used here, and specifically, a theoretical value (the length defined as the product specification of the carrier sheet 5) or the actual size is used. In the present embodiment, the document setting portion 53 and the lower end portion 52 of the carrier sheet 5 (the portion excluding the upper end portion 51 of the carrier sheet 5) are used as the predetermined portion of the carrier sheet 5. In other words, in the present embodiment, the first length A1 is the conveying direction length of the document setting portion 53 and the lower end portion 52 (a length obtained by subtracting the conveying direction length of the upper end portion 51 from the overall conveying direction length of the carrier sheet 5) (see FIG. 5). However, the conveying direction length of another portion of the carrier sheet 5 may be used as the first length A1. For example, the length of the document setting portion 53, the length of the upper end portion 51, the length of the lower end portion 52, the overall length of the carrier sheet 5, or the like can be used as the first length A1.

Note that the first acquisition unit 23 can acquire the first length A1 according to the type of the carrier sheet 5 determined by the sheet determination unit 22. A specific acquisition method will be described later.

The second acquisition unit 24 acquires the second length A2, which is the conveying direction length of the predetermined portion in the scanned image. The conveying direction length A2 acquired here is the conveying direction length of the image obtained by scanning, and may be different from the actual length A1 in the conveying direction due to imaging being performed during conveying. The second acquisition unit 24 can calculate the second length A2 based on the number of pixels per unit length of the scanned image (e.g., dpi (dots per inch)) and the number of pixels in the conveying direction (e.g., "image length (inches)=number of pixels/dpi"). However, the calculation method for the second length A2 is not limited to this example. Other information such as the actual conveying speed detected during conveying and the pixel size may be used in the calculation of the second length A2.

Based on the first length A1 and the second length A2, the estimation unit 25 estimates the ratio B1:B2 between the document length B1, which is the conveying direction length of the document 9, and the document image length B2, which is the conveying direction length of the document 9 in the scanned image. Here, the conveying direction length of the document 9 is specifically a theoretical value (a length determined in advance for each document type; e.g., 297.0 mm in the case where the document is A4), or the actual length. Specifically, the estimation unit 25 estimates that the ratio A1:A2 between the first length A1 and the second length A2 and the ratio B1:B2 between the document length B1 and the document image length B2 are the same, calculates the ratio A1:A2 based on the first length A1 and the second length A2, which are obtained by the first acquisition unit 23 and the second acquisition unit 24, and estimates the ratio B1:B2 between the document length B1 and the document image length B2 using the calculated value. However, the estimated ratio does not have to be equal to the ratio A1:A2 that is based on the first length A1 and the second length A2. The ratio B1:B2 between the document length B1 and the document image length B2 may be estimated by multiplying the ratio A1:A2 by some sort of coefficient based on an empirical rule or the like. Note that in the present embodiment, the stretch ratio A2/A1 is used as information for expressing the estimated ratio B1:B2 or A1:A2.

The length calculation unit 26 calculates the document image length B2 for a predetermined document type based on the document length B1 for the predetermined document type and the estimated ratio.

The type identification unit 27 identifies a document type that fits the cropped image by comparing the document image length B2 for the predetermined document type calculated by the length calculation unit 26 with the length of a cropped image cut out by the image processing unit 28 to.

The image processing unit 28 cuts out a cropped image from the scanned image before or after applying correction that is based on the estimated ratio. Note that various methods may be adopted as the specific image cropping method used by the image processing unit 28. For example, the image processing unit 28 may cut out a cropped image (so-called content crop) by removing a portion of a scanned image in which content is not displayed, may cut out a cropped image from a corrected scanned image in accordance with the document length B1, or may cut out a cropped image from an uncorrected scanned image in accordance with the document image length B2. In addition, the image processing unit 28 further executes later-described front-back combining processing, output image generation processing, and the like.

Next, a flow of processing executed by the information processing device 1 according to the present embodiment will be described. Note that the specific content and processing order of the processing described below are examples for carrying out the present disclosure. The specific processing content and processing order may be appropriately selected according to the embodiment of the present disclosure.

Figure 6:
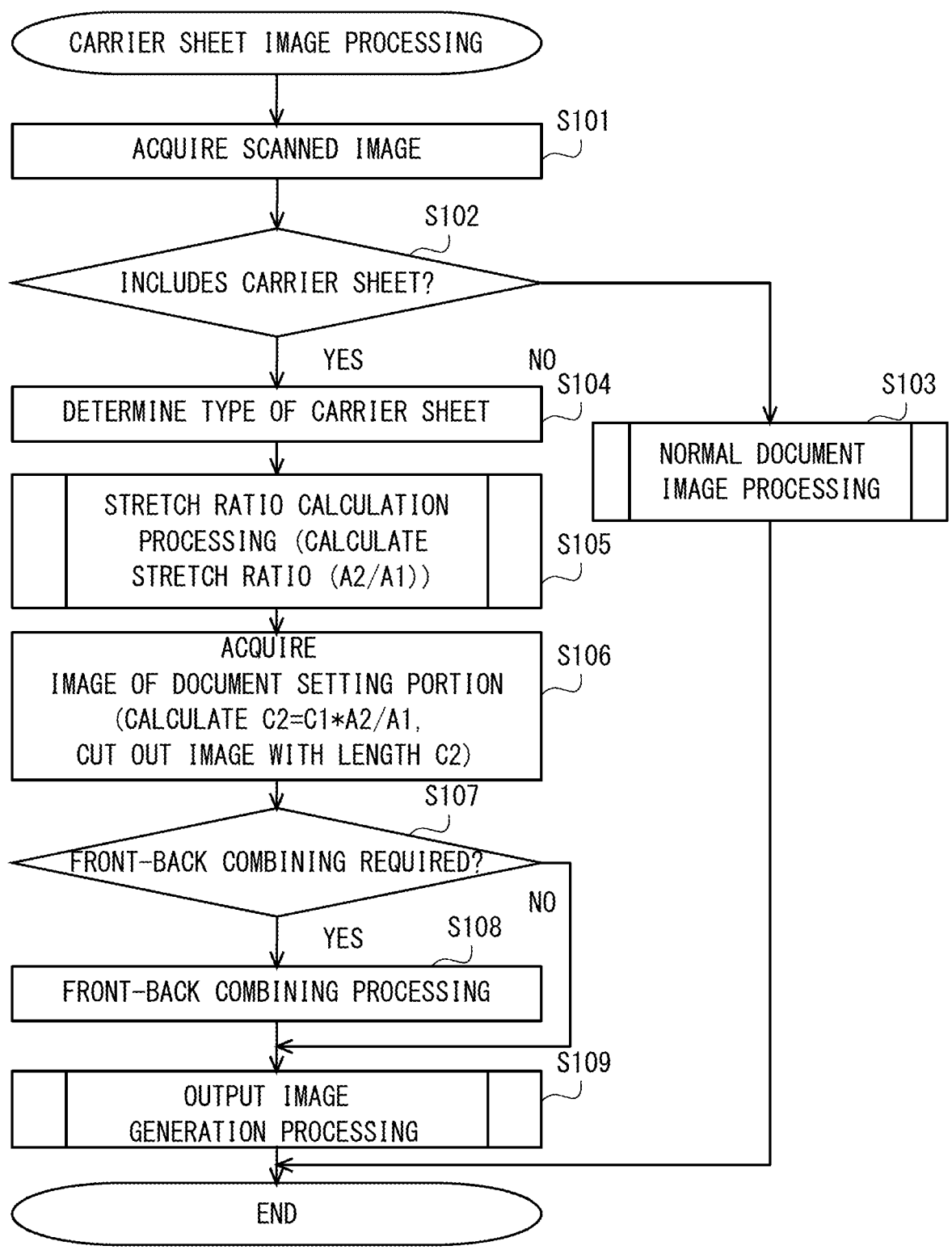
FIG. 6 is a flowchart showing a flow of carrier sheet image processing according to the first embodiment.

FIG. 6 is a flowchart showing the flow of carrier sheet image processing according to the present embodiment. The carrier sheet image processing according to the present embodiment is executed when image data obtained by the imaging unit 37 is acquired by the image acquisition unit 21.

In step S101, a scanned image is acquired. In the present embodiment, the image obtained by imaging performed by the imaging unit 37 is an over-scanned image captured beyond the edges of the imaging target (carrier sheet 5 in the present embodiment). For this reason, the image acquisition unit 21 detects edges from the so-called over-scanned image obtained from the imaging unit 37 and performs image cropping at the edges so that the upper end, the lower end, the left end, and the right end of the carrier sheet 5 are the upper end, the lower end, the left end, and the right end of the scanned image. The edge detection technique used here may be a conventional technique, and thus the description thereof will be omitted. Thereafter, the processing proceeds to step S102.

In step S102, it is determined whether or not the scanned image includes the carrier sheet 5. The sheet determination unit 22 determines whether or not a predetermined mark (see FIG. 4) indicating that the scanned image is an image captured using the carrier sheet 5 is included in the upper end portion 51 of the scanned image, and then determines whether the scanned image is an image of only the document or an image that includes the carrier sheet 5. If it is determined that the scanned image is an image of only the document, the processing proceeds to step S103. On the other hand, if it is determined that the scanned image is an image that includes the carrier sheet 5, the processing proceeds to step S104.

In step S103, normal document image processing is executed. If it is determined that the scanned image is an image of only the document, the image processing unit 28 performs image processing on the general document image on the scanned image (document image). Since it is possible to use a conventional technique for image processing of a general document image, the description thereof will be omitted. Thereafter, the processing shown in this flowchart ends.

In step S104, the type of the carrier sheet 5 is determined. If it is determined that the scanned image is an image that includes the carrier sheet 5, the sheet determination unit 22 determines the type of the carrier sheet 5 based on the scanned image. In the present embodiment, the sheet determination unit 22 determines the type of the carrier sheet 5 by determining which of various preset ranges the conveying direction length (height) of the scanned image and/or the length (width) of the scanned image in the direction orthogonal to the conveying direction is in.

For example, assume that there are two types of carrier sheet 5, one being an A3 carrier sheet (a carrier sheet having a height of 355 mm for obtaining an full image of an A3 document by folding the A3 document to a size equivalent to A4, sandwiching it in the carrier sheet, and then performing front-back combining processing to combine the scan results for the two sides), and one is a photograph carrier sheet (a carrier sheet having a height of 170 mm for protecting a photograph); in this case, the sheet determination unit 22 determines that the carrier sheet 5 is the A3 carrier sheet if the height of the scanned image is greater than or equal to a threshold value of 262.5 mm, which is the median of the above values, and determines that the carrier sheet 5 is the photograph carrier sheet if the height of the scanned image is less than the threshold value. According to such a determining means, the type of the carrier sheet 5 can be determined even if the carrier sheet 5 side is not provided with a determination mechanism (e.g., a mark/shape/magnetic tape/IC chip for determining the type). Thereafter, the processing proceeds to step S105.

However, other methods may be adopted as the method for determining the type of the carrier sheet 5. The sheet determination unit 22 may perform determination by extracting an image of a type identification mark or the like pre-printed on the carrier sheet 5 from the scanned image, or some sort of determining means (mark/shape/magnetic tape/IC chip for determination, etc.) provided in advance on the carrier sheet 5 may be read by an optical/mechanical/magnetic/electronic or other reading means when the carrier sheet 5 is conveyed or subjected to imaging.

In step S105, the stretch ratio A2/A1 of the scanned image generated by image conveying scanning is calculated by executing stretch ratio calculation processing. The details of stretch ratio calculation processing will be described later with reference to FIG. 8. Thereafter, the processing proceeds to step S106.

In step S106, an image of the document setting portion 53 is acquired. The image processing unit 28 also removes the lower end portion 52 of the carrier sheet 5 from the scanned image from which the upper end portion 51 has been removed by the stretch ratio calculation processing. However, in the carrier sheet 5 used in the present embodiment, the lower end portion 52 does not have a band or a mark for specifying the removed portion. For this reason, the image processing unit 28 removes the lower end portion 52 of the carrier sheet 5 by cutting out an image having a size corresponding to the document setting portion 53 from the scanned image. Specifically, the length calculation unit 26 acquires the document setting portion length C1, which is the conveying direction length of the document setting portion 53 stored in the storage device 14 in advance in accordance with the carrier sheet type, and corrects the acquired length using the stretch ratio A2/A1 to obtain the document setting portion image length C2, which is the conveying direction length of the document setting portion 53 in the scanned image (C2=C1*A2/A1) (see FIG. 5). Then, the image processing unit 28 removes the lower end portion 52 of the carrier sheet 5 from the scanned image by cutting out an image having the calculated length C2 from the upper end of the image. Thereafter, the processing proceeds to step S107.

In steps S107 and S108, front-back combining processing is executed if necessary. The image processing unit 28 checks setting content recorded in the RAM 13 or the storage device 14 in order to determine whether or not a user reading setting is a setting for processing for generating a single image that combines a front side scan result and a back side scan result obtained by double-sided scanning (hereinafter referred to as "front-back combining processing") (step S107). If front-back combining has been set by the user, the image processing unit 28 performs front-back combining processing by combining the front side scan result and the back side scan result according to the reference point 54 (see FIG. 4), and obtains a front-back combined scanned image (step S108).

Figure 7:
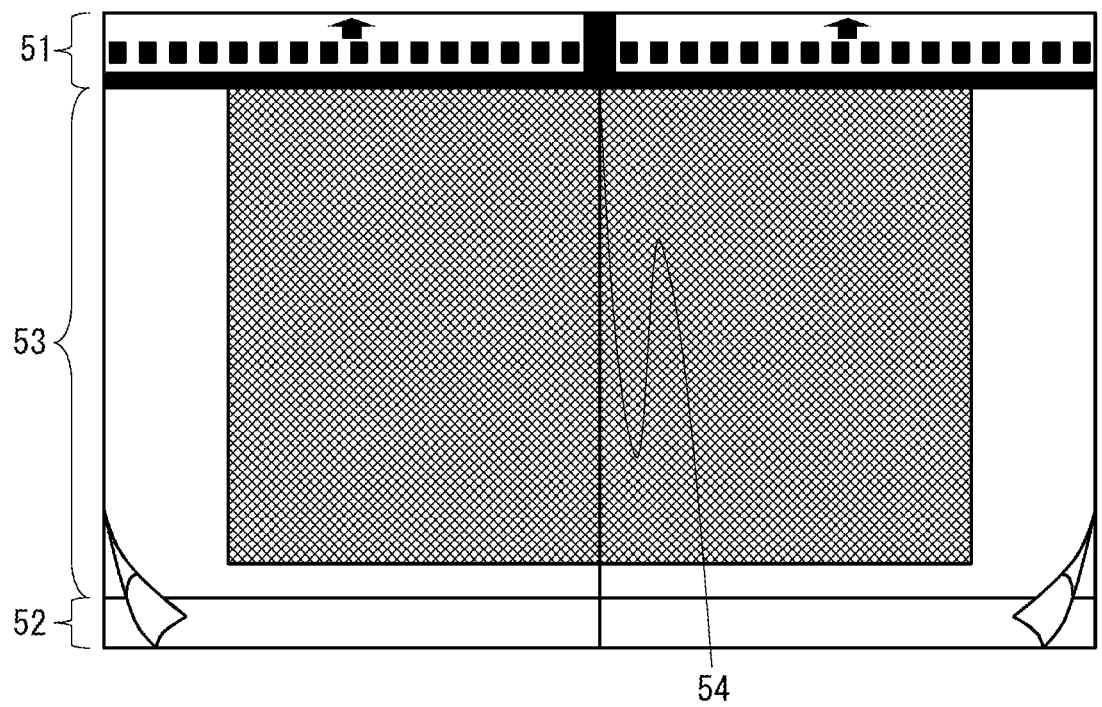
FIG. 7 is a diagram showing a front-back combined scanned image in the first embodiment.

FIG. 7 is a diagram showing a front-back combined scanned image in the present embodiment. According to FIG. 7, it can be seen that the front-back combined scanned image is an image obtained by combining the front side scan result and the back side scan result according to the reference point 54. When the front-back combined scanned image has been obtained, the processing proceeds to step S109.

In step S109, output image generation processing is executed. Details of the output image generation processing will be described later with reference to FIG. 9. Thereafter, the processing shown in this flowchart ends.

Figure 8:
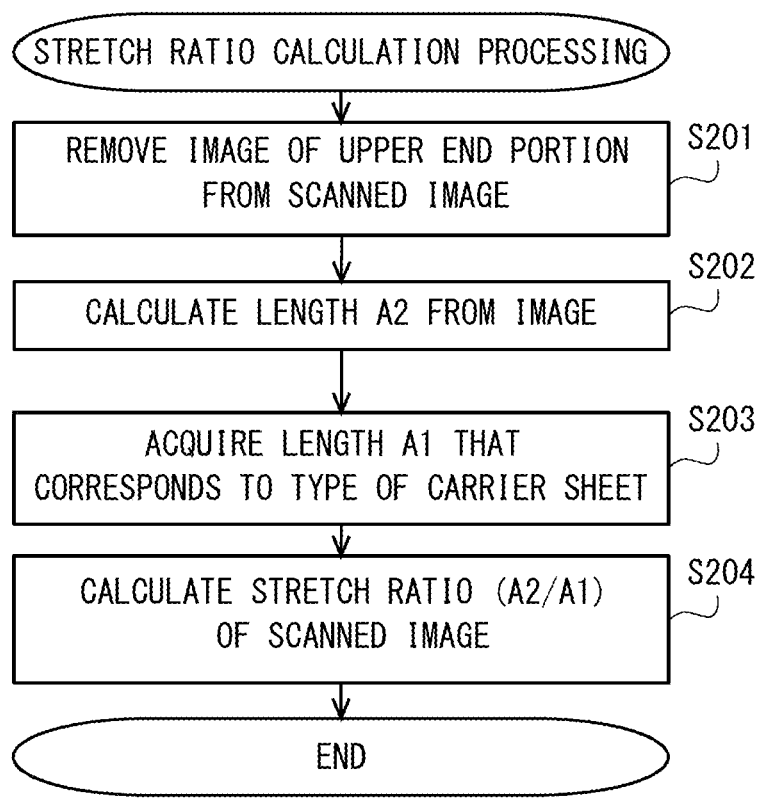
FIG. 8 is a flowchart showing a flow of stretch ratio calculation processing according to the first embodiment.

FIG. 8 is a flowchart showing the flow of stretch ratio calculation processing according to the present embodiment. The stretch ratio calculation processing according to the present embodiment corresponds to step S105 in the carrier sheet image processing described with reference to FIG. 6.

In steps S201 and S202, the image of the upper end portion 51 is removed, and the length of the predetermined portion of the carrier sheet 5 in the image is calculated. The image processing unit 28 removes a portion corresponding to the upper end portion 51 of the carrier sheet 5 from the scanned image obtained in step S101 of the carrier sheet image processing (step S201). Specifically, the image processing unit 28 detects an L-shaped black band (see FIG. 4) for detecting the reference point 54 and the upper end portion 51 from the scanned image, thereby specifying the upper end portion 51 of the carrier sheet 5 in the scanned image and removing the specified portion. The second acquisition unit 24 then calculates the second length A2, which is the conveying direction length of the obtained image. Since the method of calculating the length from the image is as described above, the description thereof will be omitted (step S202). Thereafter, the processing proceeds to step S203.

In steps S203 and S204, the theoretical value of the length of the predetermined portion of the carrier sheet 5 is acquired, and the stretch ratio of the scanned image is calculated. Based on the type of the carrier sheet 5 determined in step S104 of the carrier sheet image processing, the first acquisition unit 23 acquires the first length A1 that corresponds to the type of the carrier sheet 5, which is stored in the storage device 14 (step S203). Then, the estimation unit 25 calculates the ratio A1:A2 between the first length A1 and the second length A2 (in the present embodiment, the "stretch ratio of the scanned image A2/A1") (step S204). Thereafter, the processing shown in this flowchart ends.

Figure 9:
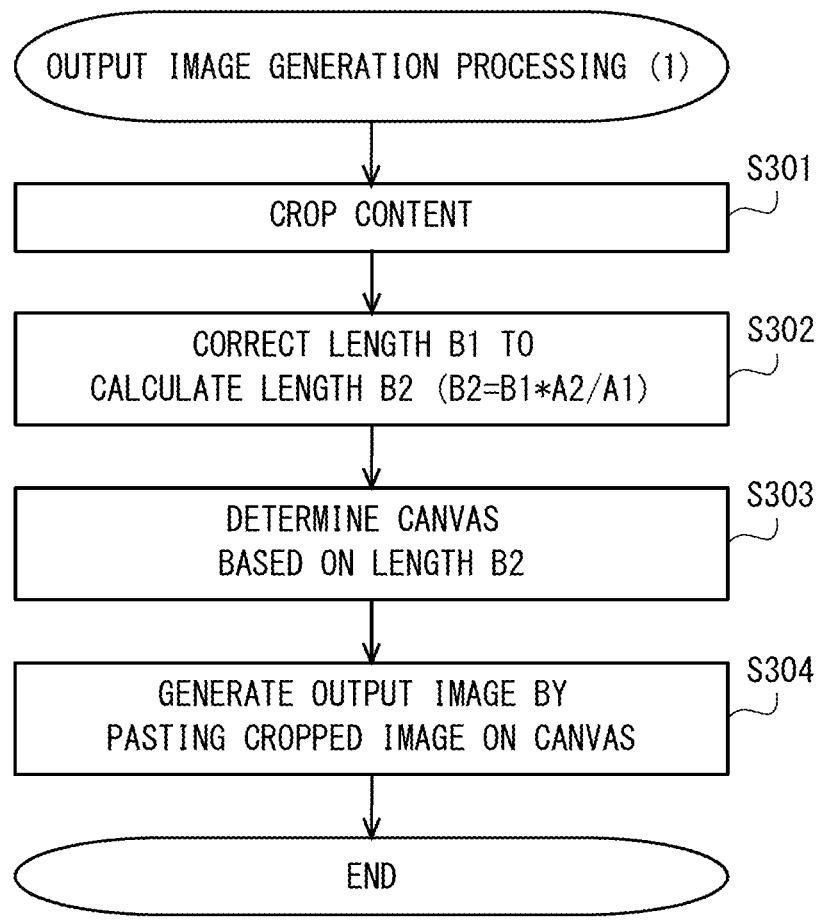
FIG. 9 is a flowchart showing a flow of output image generation processing (1) according to the first embodiment.

FIG. 9 is a flowchart showing the flow of output image generation processing (1) according to the present embodiment. The output image generation processing (1) according to the present embodiment corresponds to step S109 in the carrier sheet image processing described with reference to FIG. 6.

In step S301, so-called content cropping is executed. The image processing unit 28 cuts out a portion of the scanned image in which content is displayed (hereinafter, called the "cropped image") by removing the portion not including content from the scanned image (the scanned image from which the upper end portion 51 and the lower end portion 52 of the carrier sheet 5 were removed in steps S201 and S106, and that includes only the document setting portion 53). The content crop technique used here may be a conventional technique, and thus the description thereof will be omitted. Thereafter, the processing proceeds to step S302.

In step S302, the conveying direction length for each document type is corrected, and the document image length B2 is calculated. The length calculation unit 26 corrects the document length B1 of an image which serves as the base on which the cropped image acquired in step S301 is to be placed (hereinafter, referred to as "canvas"). For example, if a pre-provided list of canvases includes A4 (height 297.0 mm), A5 (height 210.0 mm), A5 width (height 148.0 mm), A6 (height 148.0 mm) and B5 (height 257.0 mm), each of these standard heights (document length B1) is corrected using the stretch ratio A2/A1 of the scanned image calculated in step S204, thus calculating the corrected height (document image length B2) (B2=B1*A2/A1) (see FIG. 5). Thereafter, the processing proceeds to step S303.

In step S303, the canvas is determined. The type identification unit 27 compares the height and width of the cropped image obtained in step S301 with the height and width of each canvas (document image length B2) and width prepared in the canvas list, to determine the smallest canvas that can contain the cropped image. At this time, the height corrected in step S302 is used as the height of the canvas in the comparison. Accordingly, even if the conveying direction length (height) of the image differs from the actual conveying direction length (height) of the imaging target due to conveying during scanning, an appropriate canvas can be selected. Thereafter, the processing proceeds to step S304.

In step S304, an output image that corresponds to the size of the specified document type is generated. The image processing unit 28 generates an output image by pasting the cropped image obtained in step S301 at the center of the canvas image (height B2) selected in step S303 after height correction in step S302. The generated output image is output to the user as the final result of reading performed by the scanner and image processing performed by the information processing device 1, and is stored in the storage device 14. Thereafter, the processing shown in this flowchart ends.

Second Embodiment

Also, in the output image generation processing (1) described with reference to FIG. 9, an image that has undergone stretching/contraction due to being conveyed during imaging is handled by correcting the canvas size or the cutout size without correcting stretching/contraction of the image itself, but an image that has undergone stretching/contraction due to being conveyed during imaging may be handled by correcting stretching/contraction of the image itself. The following describes output image generation processing in the case where an image that has undergone stretching/contraction due to being conveyed during imaging is handled by correcting stretching/contraction of the image itself.

Figure 10:
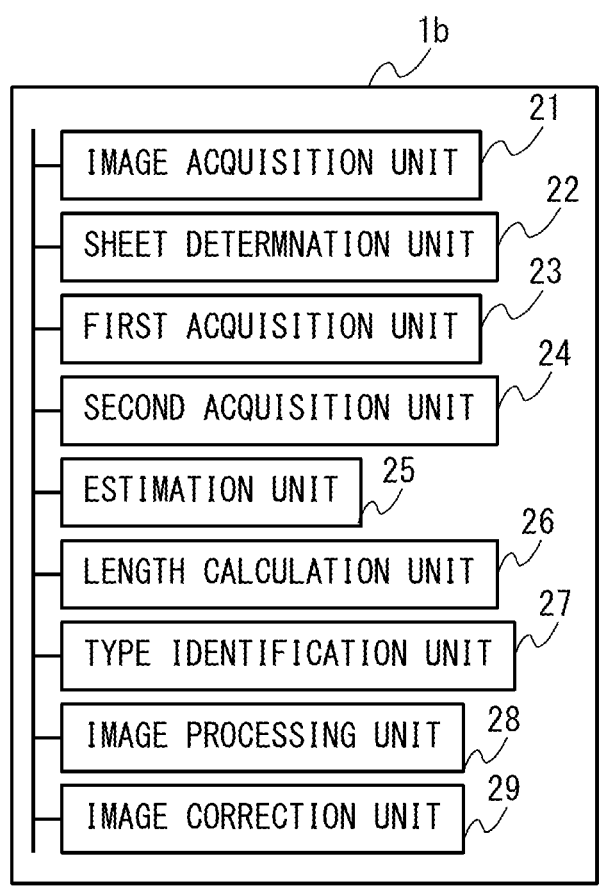
FIG. 10 is a diagram showing an overview of a functional configuration of the information processing device according to a second embodiment.

FIG. 10 is a diagram showing an overview of the functional configuration of an information processing device 1b according to the second embodiment. The information processing device 1b according to the present embodiment includes an image correction unit 29 in addition to the constituent elements of the information processing device 1 described above with reference to FIG. 3.

The image correction unit 29 corrects the length of the scanned image or the length of the cropped image cut out from the scanned image based on an estimated ratio.

Next, the flow of processing executed by the information processing device 1b according to the second embodiment will be described. Since the carrier sheet image processing and the stretch ratio calculation processing described with reference to FIGS. 6 and 8 are similar to the above-described embodiment, descriptions thereof are omitted, and only output image generation processing (2) executed in place of the output image generation processing (1) described with reference to FIG. 9 will be described. Note that the specific content and processing order of the processing described below are examples for carrying out the present disclosure. The specific processing content and processing order may be appropriately selected according to the embodiment of the present disclosure.

Figure 11:
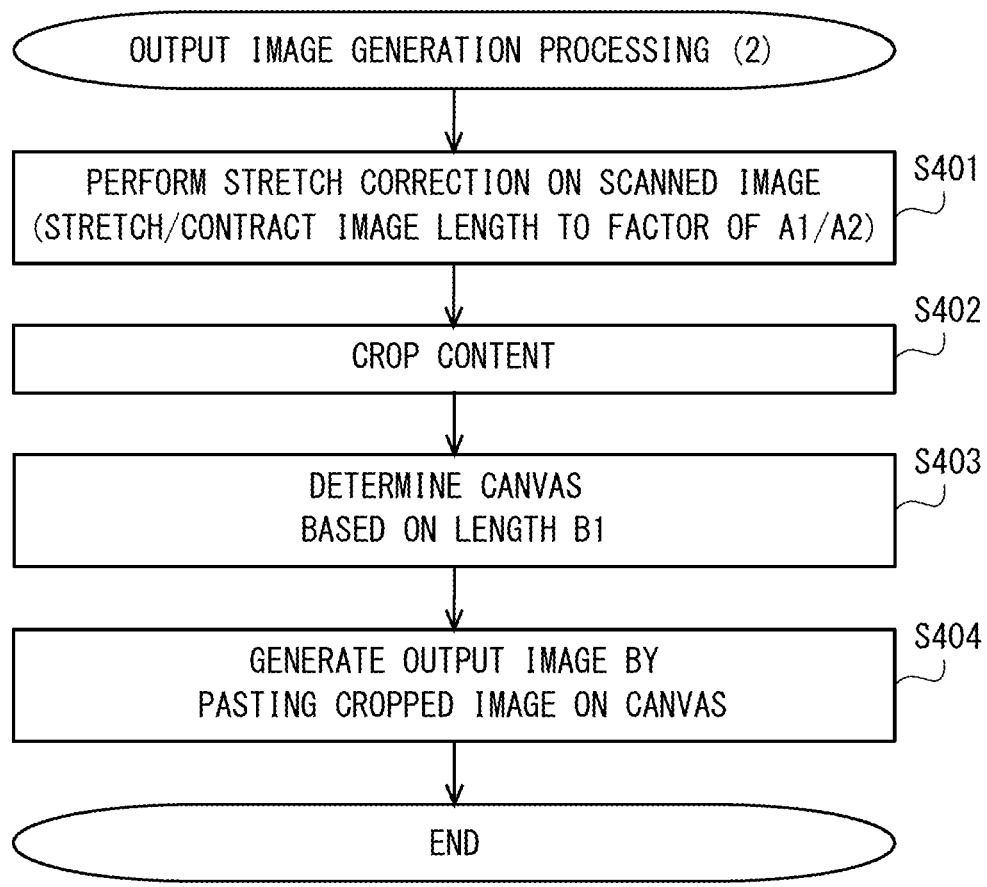
FIG. 11 is a flowchart showing a flow of output image generation processing (2) according to the second embodiment.

FIG. 11 is a flowchart showing a flow of output image generation processing (2) according to the second embodiment. The output image generation processing (2) according to the present embodiment corresponds to step S109 in the carrier sheet image processing described with reference to FIG. 6.

In step S401, the size of the scanned image is subjected to stretch correction. By stretching/contracting the conveying direction length of the scanned image (the scanned image from which the upper end portion 51 and the lower end portion 52 of the carrier sheet 5 were removed in steps S201 and S106, and that includes only the document setting portion 53) based on the stretch ratio A2/A1 of the scanned image calculated in step S204, the image correction unit 29 corrects the length of the scanned image itself to the length inferred to be the conveying direction length of the actual reading target (specifically, stretches/contracts the image to a factor of A1/A2 in the conveying direction). Pixel complementation or thinning is required for image stretch correction, but detailed description will be omitted because prior art may be used for image stretch correction. Thereafter, the processing proceeds to step S402.

In step S402, content cropping is executed. The image processing unit 28 cuts out a portion (cropped image) in which content is displayed from the scanned image by removing the portion in which content is not displayed from the scanned image that has been subjected to stretch correction. Thereafter, the processing proceeds to step S403.

Note that in the present embodiment, an example is described in which stretch correction is performed on an image at a timing that is after the upper end portion 51 and the lower end portion 52 of the carrier sheet 5 have been removed from the scanned image and before the cropped image is acquired, but image stretch correction may be performed at any stage after the stretch ratio of the image has been determined. For example, a configuration is possible in which the processing order of step S401 and step S402 is switched, and stretch correction is performed on the cropped image.

In step S403, the canvas is determined. The type identification unit 27 compares the height and width of the cropped image obtained in step S402 with the height and width of each canvas (document image length B1) and width prepared in the canvas list, to determine the smallest canvas that can contain the cropped image. At this time, unlike the first embodiment, the height of the canvas used in comparison is the original height that has not been corrected. In the present embodiment, since the length of the image has been subjected to stretch correction in step S401, it is possible to select an appropriate canvas even if the conveying direction length (height) of the image differs from the actual conveying direction length (height) of the imaging target due to conveying during scanning. Thereafter, the processing proceeds to step S404.

In step S404, an output image that corresponds to the size of the specified document type is generated. The image processing unit 28 generates an output image by pasting the cropped image obtained in step S402 at the center of the canvas image (height B1) selected in step S403. The generated output image is output to the user as the final result of reading performed by the scanner and image processing performed by the information processing device 1b, and is stored in the storage device 14. Thereafter, the processing shown in this flowchart ends.

Other Variations

In the embodiment described above, embodiments are described in which the final output image is generated by pasting the cropped image obtained by content cropping on a canvas suitable for the size of the cropped image, but an image generated by other methods may be adopted as the output image. For example, the cropped image may be used as the output image as it is, or the size of the canvas on which the cropped image is pasted may be a size specified by the user.

Also, in the above-described embodiment, an example is described in which content cropping is adopted as the method of cutting out the cropped image from the scanned image, but other methods may be adopted as the method of cutting out the cropped image. For example, a method may be adopted in which a cropped image of a specified size is cut out from the scanned image. At this time, the cutout range may be specified by edge detection performed on the document 9, or may be specified by using the reference point 54 as one vertex of a rectangle of the cutout range.

Also, when obtaining a cropped image from a front-back combined scanned image (see FIG. 7), it is possible to cut out an image of a specified size (e.g., A3) centered on the reference point 54 (the point where the front and back images are combined).

Also, regarding the cutout size, a configuration is possible in which a user-designated document length B1 is corrected by the stretch ratio A2/A1 of the scanned image, and the corrected height (document image length B2) is used as the cutout size.

Also, in the embodiments described above, examples were described in which an image captured by the scanner is sent to the information processing device 1, and the information processing device 1 executes carrier sheet image processing, stretch ratio calculation processing, output image generation processing, and the like, but part or all of the functions provided in the information processing device 1 in the above-described embodiment may be implemented in the scanner 3 and processed on the scanner side.

What is claimed is:

1. An information processing device comprising a processor configured to:
    acquire a scanned image of a document and a protective sheet that protects the document, the scanned image being obtained by imaging the document and the protective sheet while being conveyed at the same time;
    acquire a first length that is a conveying direction length of a predetermined portion of the protective sheet;
    acquire a second length that is a conveying direction length of the predetermined portion in the scanned image;
    estimate a ratio between a document length, which is a conveying direction length of the document, and a document image length, which is a conveying direction length of the document in the scanned image, based on the first length and the second length; and
    correct a length of the scanned image or a length of a cropped image cut out from the scanned image, based on the ratio.

2. The information processing device according to claim 1,
    wherein the processor cuts out the cropped image by removing a portion in which content is not displayed in the scanned image.

3. The information processing device according to claim 1,
    wherein the processor cuts out the cropped image from the scanned image that has been or has not yet been corrected based on the ratio estimated by the processor.

4. The information processing device according to claim 3,
    wherein the processor cuts out the cropped image from the scanned image that has been corrected, in accordance with the document length.

5. The information processing device according to claim 3,
    wherein the processor cuts out the cropped image from the scanned image that has not yet been corrected, in accordance with the document image length.

6. The information processing device according to claim 1, wherein the processor further calculates a document image length for a predetermined document type based on the ratio and a document length for the predetermined document type.

7. The information processing device according to claim 6, the processor further identifies a document type that suits the cropped image by comparing the document image length for the predetermined document type calculated by the processor with the length of the cropped image cut out by the processor.

8. The information processing device according to claim 1, the processor further determines whether or not an image of the protective sheet is included in the scanned image.

9. The information processing device according to claim 8,
    wherein the processor furthermore determines a type of the protective sheet included in the scanned image, and the processor acquires the first length in accordance with the type of the protective sheet.

10. The information processing device according to claim 1, further comprising:
    a sheet feeder conveying the document and the protective sheet at the same time; and
    a scanner capturing an image of a target conveyed by the sheet feeder.

11. A method for causing a computer to:
    acquire a scanned image of a document and a protective sheet that protects the document, the scanned image being obtained by imaging the document and the protective sheet while being conveyed at the same time;
    acquire a first length that is a conveying direction length of a predetermined portion of the protective sheet;
    acquire a second length that is a conveying direction length of the predetermined portion in the scanned image;
    estimate a ratio between a document length, which is a conveying direction length of the document, and a document image length, which is a conveying direction length of the document in the scanned image, based on the first length and the second length; and
    correct a length of the scanned image or a length of a cropped image cut out from the scanned image, based on the ratio.

12. A non-transitory computer-readable recording medium having recorded thereon a program for causing a computer to:
    acquire a scanned image of a document and a protective sheet that protects the document, the scanned image being obtained by imaging the document and the protective sheet while being conveyed at the same time;
    acquire a first length that is a conveying direction length of a predetermined portion of the protective sheet;
    acquire a second length that is a conveying direction length of the predetermined portion in the scanned image;
    estimate a ratio between a document length, which is a conveying direction length of the document, and a document image length, which is a conveying direction length of the document in the scanned image, based on the first length and the second length; and
    correct a length of the scanned image or a length of a cropped image cut out from the scanned image, based on the ratio.

* * * * *